United States Patent [19]

Baxter

[11] Patent Number: 5,022,768
[45] Date of Patent: Jun. 11, 1991

[54] MOULDED ROLLER BEARINGS AND RETAINER CAGE AND METHOD OF ASSEMBLING DRAWER SLIDES

[75] Inventor: Alan R. Baxter, Waterloo, Canada

[73] Assignee: Waterloo Metal Stampings Ltd., Waterloo, Canada

[21] Appl. No.: 520,657

[22] Filed: May 10, 1990

[30] Foreign Application Priority Data

Aug. 28, 1989 [CA] Canada ................................. 609551

[51] Int. Cl.⁵ ...................... F16C 29/04; F16C 33/46; A47B 88/00
[52] U.S. Cl. ........................................ 384/19; 384/51; 384/59
[58] Field of Search ...................... 384/19, 35, 50, 51, 384/53–56, 59, 572, 576, 623

[56] References Cited

U.S. PATENT DOCUMENTS

| | | | |
|---|---|---|---|
| 3,164,418 | 1/1965 | Biesecker | 384/19 |
| 3,464,285 | 9/1969 | McCabe | 384/572 X |
| 4,783,182 | 11/1988 | Caron et al. | 384/523 X |
| 4,886,377 | 12/1989 | Adachi et al. | 384/50 X |

*Primary Examiner*—Thomas R. Hannon
*Attorney, Agent, or Firm*—Wenderoth, Lind & Ponack

[57] ABSTRACT

A moulded roller bearing cage assembly for use for drawers and cabinets replaces standard metallic bearing cages and balls. The bearing cage, its rollers detachably fixed within the apertures, is loaded between the flanges of the channels on the standard two or three part drawer slide. The rollers before and during assembly are fixed at their ends integrally with the cage to allow for easy installation. Once the rollers come in contact with the raceways of the installation the detachable links are broken allowing the rollers to be free to rotate. The rollers and cages can be moulded in any configuration to allow for different channel and raceway shapes.

9 Claims, 2 Drawing Sheets

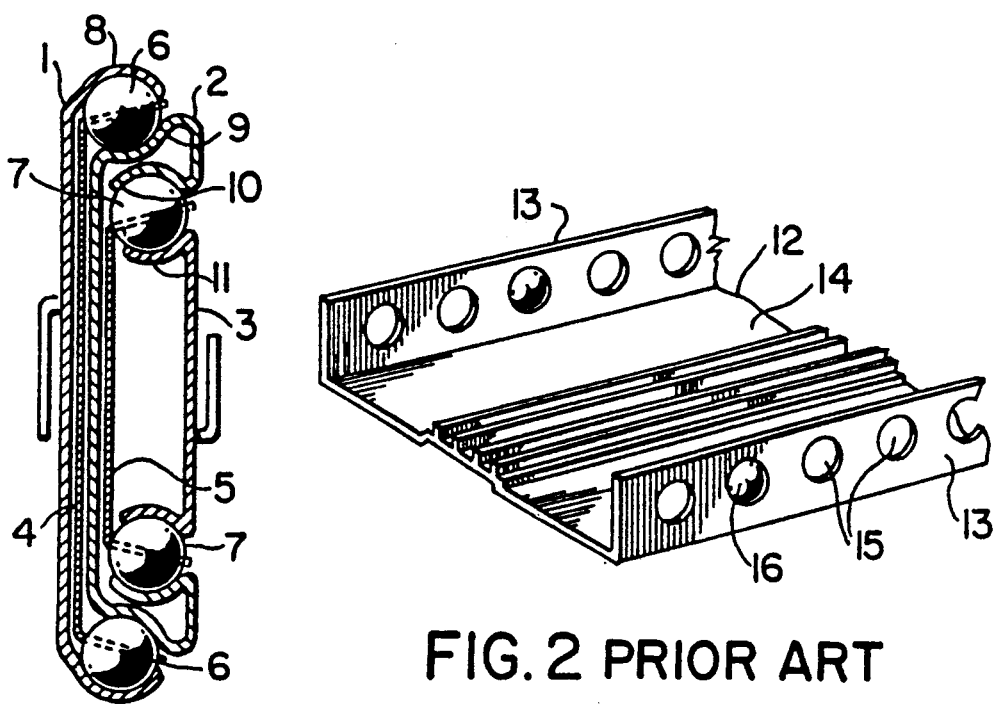
FIG. 1 PRIOR ART
FIG. 2 PRIOR ART
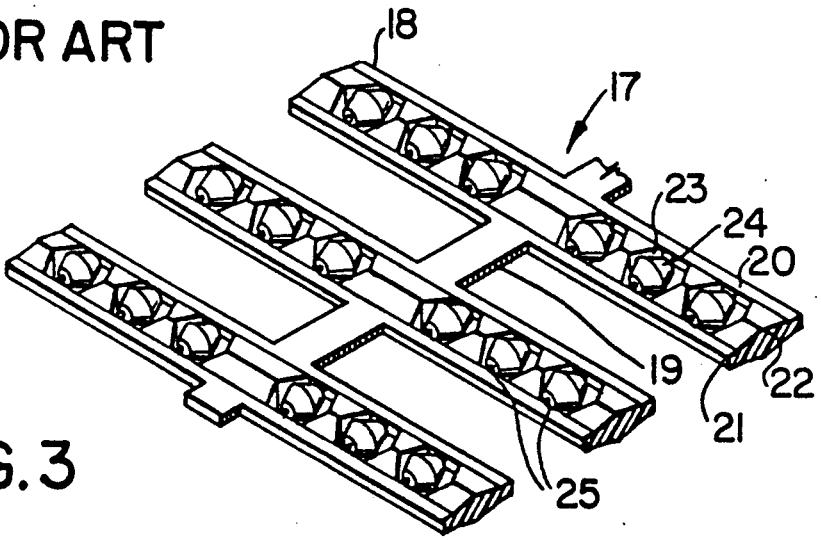
FIG. 3
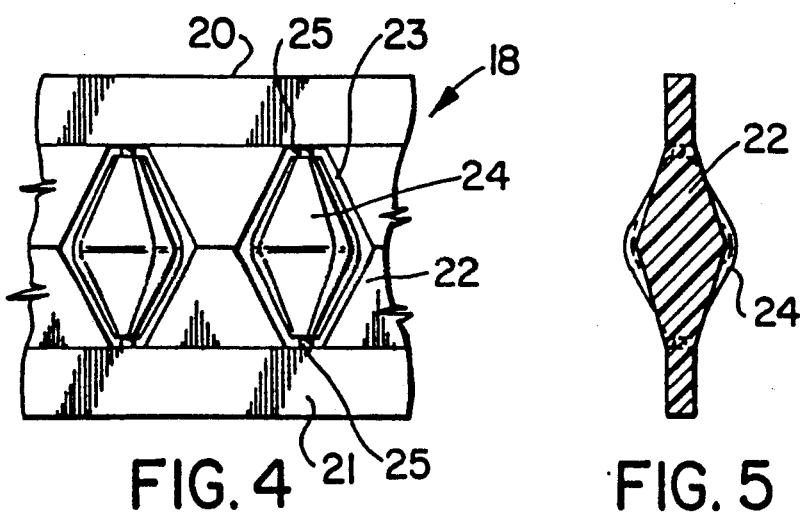
FIG. 4
FIG. 5

MOULDED ROLLER BEARINGS AND RETAINER CAGE AND METHOD OF ASSEMBLING DRAWER SLIDES

FIELD OF INVENTION

This invention relates to drawers and cabinets and particularly sliding mechanisms for drawers and cabinets. More particularly this invention relates to bearings and cages such as ball retainers for the slides of drawers and cabinets.

BACKGROUND OF THE INVENTION

In order to reduce friction and to be able to withstand heavy loading, drawer slides for such applications as file cabinets employ bearings to reduce wear. Two types of slides are commonly used in file cabinets.

One type of slide which employs two or three channels can be taken apart in order that the outer slide can be attached to the cabinet wall and the inner slide attached to the side of the drawer or vice versa. In such applications, a bearing cage retainer is used in conjunction with metal ball bearings. The former retains the balls between the retainer and the inner side of the flange. Clearly the apertures in the bearing retainer have a smaller circumference than that of the balls.

In other applications where it is not necessary to take apart the drawer slide after assembly for later installation in the cabinet a second type of drawer slide is used. In this second type of drawer slide, different retainers can be used. All of these retainers have in common apertures in the retainer which are larger than the diameter of the balls. The balls are prevented from laterally displacing by the two adjacent flanges of the channels. Since these channels are not disassembled during installation on the drawer and cabinet the second type of retainer can be used.

One model of this second type of retainer is manufactured from plastic in the form of a channel having upturned side flanges much the same as the metal channel slides used to form the slide itself. Apertures are made along both flanges and balls are inserted during assembly.

Another model of this second type of retainer in use, employs a longitudinal plastic bar which fits between the flanges of the outer and intermediate or intermediate and inner channels. It has two or more apertures in which metal balls are inserted (often by hand) during assembly.

It is the second type of slides, that is to say those which are not disassembled for installation, to which the present invention pertains.

All of the aforementioned drawer slides have certain problems. Firstly the retainers are expensive. Secondly they take up additional valuable space in the drawer cabinet application. In addition the metal retainers are cumbersome to fabricate, and the slide assembly process is time consuming. Retainers must be placed in the channels by hand and then balls loaded pneumatically through ball bearing feed lines. Human error often occurs or the machine malfunctions resulting in a large number of balls escaping around the work area and causing a safety hazard. Another problem exists because of the shape of the metal balls. Because of the spherical shape all of the mating raceways of the flanges of the channels must be circular in configuration. When a three part slide is used and two sets of friction reducing retainers are used significant waste in materials and space is encountered.

SUMMARY OF THE INVENTION

The present invention seeks to overcome these problems by providing a unique moulded bearing cage with rollers formed from plastics.

It is an object of the present invention to facilitate faster, easier and less expensive assembly while maintaining the quality of the present friction reducing slides. It is a further object of the invention to provide for an inexpensive bearing cage at a fraction of the cost of those presently available. And it is a further object of this invention to reduce the loss of balls or rollers during assembly by providing a bearing cage with rollers connected thereto by a detachable link which connects the rollers to the cage. It is a further object of this invention to provide for bearing cages and rollers in varying configurations which allow for different configurations of flanges on slide channels, thereby reducing the amount of material required and, shortening the pressing or stamping time required to form such channels.

Therefore this invention seeks to provide a moulded roller bearing cage assembly for use with slides for drawers and cabinets comprising a plurality of rollers and a cage having a plurality of apertures; wherein the maximum diameter of said rollers exceeds the maximum width of said cage; said rollers being positioned in said apertures and integral with said cage and being connected to said cage at their ends solely through narrow frangible links; said frangible links serving to maintain said rollers in position in their apertures until and during the time of installation and thereafter being breakable by engagement with raceway surfaces in the installation to enable rotation.

This invention also seeks to provide a method for making drawer slides having at least two channels comprising the steps of (1) positioning a first channel member on the work station, said channel having right angled side flanges; (2) positioning at least one roller bearing cage assembly as claimed in claim 1 adjacent the inside of each side flange; (3) inserting a second narrower channel member having right angled side flanges within said first channel member, such that said roller bearing cage assembly is securely positioned between the inside of said flange of said first channel and the outside of said flange of said second channel, thereby causing said frangible links to sever and allowing said rollers to be free for rotation; (4) repeating steps (2) and (3) if a third channel is necessary.

In a preferred embodiment the bearing cage assemblies are manufactured in a two sided mould from new recently discovered thermal plastics. The bearing cage assemblies can be made in a group by using a daisy chain method. The cages are generally longitudinal in shape and of the same approximate height as the flanges of a slide channel used in a two or three part slide. The number of apertures and rollers in the bearing cage assembly can be varied depending upon the particular application. Typically a bearing cage could be anywhere from two to eight inches long and contain anywhere from six to twenty-four rollers. The cross section of the cage and rollers is dependent upon the configuration of the mating adjacent flanges of the two slide channels.

For example the configuration could be diamond shaped wherein the rollers are considerably greater in diameter at their mid-point than at their respective ends.

Other configurations however are equally useful. For example, if the two adjacent flanges of the two slides tend to come closer together at their mid-height a roller cage assembly can be moulded to have each end of the rollers larger in diameter than the mid-portion of the rollers.

Generally the assembly is moulded having the rollers attached at each of the their ends on the longitudinal axis to the top and bottom of the cage. The cages are moulded to have apertures which are greater in height and width than the rollers. The greatest thickness or greatest diameter of the rollers is always moulded larger than the maximum thickness of the cage so that it is the rollers which come in contact with the raceways rather than the cage.

It should be noted that the roller bearing cage assembly is not restricted to use with two or three part slide channels for cabinets. Because of the versatility of the unique roller bearing assembly of the present invention it can be used in any type of application where a drawer and cabinet is used. For example it could be used on kitchen drawers to provide an inexpensive method of reducing friction and wear. Because of the versatility of the moulding process the size, length, height and thickness of the cages and rollers can be varied to any application.

In the preferred embodiment the bearing cage assemblies contain a number of apertures in each of which a roller bearing is located and connected at its axis to the top and bottom of the cage. The cage assemblies are moulded on a daisy chain and are fed on a roller toward the work station. An outer slide or flange is placed on the work station and a cage assembly is lowered downward inside and adjacent to the flange on the outer side channel. Thereafter an intermediate or inner slide is slid therein such that the inside portion of the flange of the outer channel is on one side of the rollers and the outside portion of the flange of the inner or intermediate channel is adjacent the opposite side of the rollers thereby holding the cage assembly in position. When the outside edges of the rollers come in contact with the flange raceways the frangible links attaching the rollers to the cage are broken thereby leaving the rollers for free rotation. The two flanges of the channels prevent the rollers from laterally displacing, and the side, upper and lower limits of the aperture of the bearing cage prevent up and down and longitudinal displacement of the rollers. Limiting stops can be placed between the flanges so that the roller cage does not stray from between the two flanges in the longitudinal direction.

BRIEF DESCRIPTION OF THE DRAWINGS

The invention is described in greater detail in conjunction with the following drawings wherein:

FIG. 1 is a transverse cross-section of a prior art three channel slide;

FIG. 2 is a perspective view of a portion of a standard ball retainer used in such slides;

FIG. 3 is a perspective view of plurality of moulded roller bearing cage assemblies which are the subject matter of the present invention;

FIG. 4 is an enlarged side view of a moulded roller bearing cage assembly as shown in FIG. 3;

FIG. 5 is an end view of a single moulded roller bearing cage assembly as shown in FIG. 3;

DETAILED DESCRIPTION OF THE DRAWINGS

Figure 6:
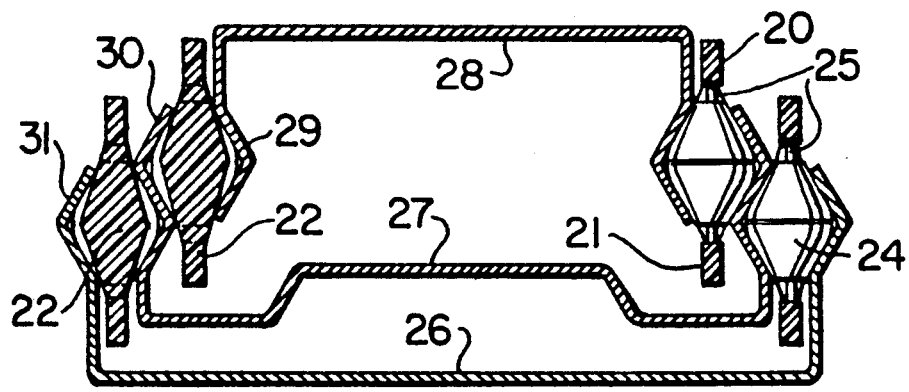
FIG. 6 is a transverse cross-section of an assembled three channel drawer slide employing moulded roller bearing cage assembly as shown in FIG. 3.

FIG. 1 illustrates a prior art three channel drawer slide. In cross-section there is an outer channel 1, an intermediate channel 2, and an inner channel 3. The channels have upturned or downturned flanges depending upon the adjacent mating flange. For example, the outer channel 1 has an upturned flange 8, and intermediate channel 2 has a more complicated configuration with an upturned flange 9 and a downturned flange 10. Inner channel 3 has a curvilinear downturned flange 11. As one can see, the flanges 8, 9, 10 and 11 must be formed in a manner such that their raceways will accommodate the standard balls 6 and 7. The balls 6 and 7 are retained in place by standard bearing cages 4 and 5 respectively. The balls reduce friction between the outer slide 1, the intermediate slide 2, and the inner slide 3.

FIG. 2 is a perspective view of a portion of a standard bearing cage 12 which is similar to that used in the prior art slide shown in FIG. 1 and noted as numbers 4 and 5. It has a base portion 14, upturned side flanges 13 with a plurality of holes 15 of slightly greater diameter than the balls 16. Once the retainers have been placed in their respective channels during assembly, balls are introduced and the flanges of adjacent channels hold the balls in place with the help of the bearing cage 12.

With this type of cage 12, the assembled drawer slide cannot be taken apart for installation in a drawer and cabinet, as the removal of any one of the three channels will result in the balls falling from place. The assembly of a three part slide using the channels, balls and retainers shown in FIGS. 1 and 2 is time consuming and often results in errors as the balls drop from their position before the two adjacent flanges of adjacent channels are in place.

FIG. 3 illustrates an embodiment of the present invention in perspective view. Number 17 shows three moulded roller bearing cage assemblies 18 attached by a detachable daisy chain 19. The individual assemblies 18 are moulded in a two part mould from thermal plastics. Roller bearing cage assembly 18 is comprised of a cage 22 having a top 20 and a bottom 21. Cage 22 has a number of apertures 23 each of which is adapted to receive roller bearing 24. During moulding and prior to assembly of a slide, the roller bearings 24 are connected and held in place in the apertures of the cage by means of frangible links 25. Generally these links are located on the longitudinal axes of the rollers at either end. However, it would be possible to attach the rollers at some other point by frangible links. One can visualize by examination of FIG. 3 that prior to assembly, the rollers 24 will not move from the retaining cage 18.

FIG. 4 is an enlarged side view of the portion of a roller bearing cage assembly 18. In the embodiment of the invention shown in FIGS. 3 and 4 a diamond shaped roller with a wide mid-section is used. The roller bearing 24 is however smaller in circumference than aperture 23 in the cage. One also views the frangible links 25 joining the roller bearing 24 to the top 20 and bottom 21 of the cage.

FIG. 5, is an end view of a bearing cage assembly 18 One notes that the diameter of the roller bearing 24 at its mid point is wider than the greatest width of the cage 22. This is necessary so that the sides of the roller, rather than the non-rotational sides of the cage come in contact with the raceways of the channel flanges.

In FIG. 6, one views an embodiment of the invention as shown in FIGS. 3, 4 and 5, in place in a cross-sectional view of a three channel drawer slide. The drawer slide has an outer channel 26, an intermediate channel 27 and an inner channel 28. The side flanges of channels 26, 27 and 28 are respectively 31, 30 and 29. The flanges are formed in such a manner as to receive one diamond shaped roller bearing assembly between the flanges intermediate channel 27 and the outer channel 26, and a second roller bearing assembly between the flanges of the intermediate channel 27 and the inner channel 28. On the left side of FIG. 6 the whole cross section of the cage 22 is shown, but on the right side a portion of the cage 22 is removed exposing the roller 24. Also in FIG. 6 the frangible links 25 are shown. However, in reality the links are broken when the 3 channels are assembled. One notes in FIG. 6 that the width of the roller 24 at its mid point is wider than that of the cage 22. Thus, the sides of the rollers turn within the raceways created by the flanges 31 and 30 and 30 and 29.

To assemble the three channel slide as shown in FIG. 6, the outer channel 26 is placed on the work place and two strings of roller bearing cage assemblies 17 on daisy chain 19 are fed downwards from an upper machine. One assembly 18 is fitted on the inside of flange 31 on one side of the channel and another is placed inside flange 31 on the other side of the channel. The intermediate channel 27 is then pushed within channel 26 from one end into place. The daisy chain link 19 is then broken. At the same time as the raceways of channel 27 i.e. flange 30 come into contact with the roller bearings 24 thereby exerting pressure against the inside of flange 31, the frangible links 25 are broken. When the two channels are in place, the rollers 24 are prohibited from longitudinal, vertical and transverse movement (but are still free for rotation) from their positions in the cage assembly 18, even though the frangible links are broken.

Figure 7:
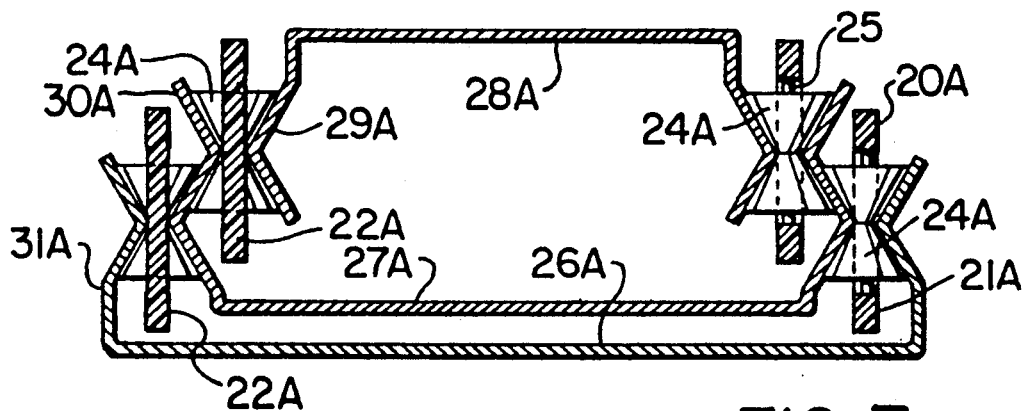
FIG. 7 is a transverse cross-section of an assembled three channel drawer slide using an alternative embodiment of the present invention.
Figure 8:
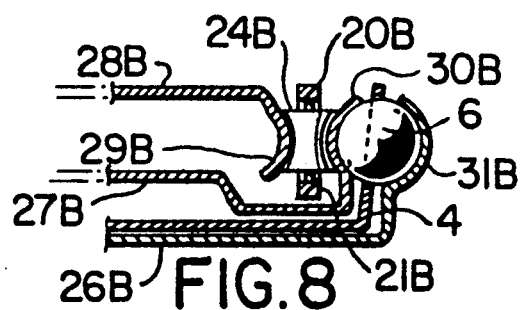
FIG. 8 is a transverse cross-section of a three channel drawer slide employing a third embodiment of the invention in place between the inner and intermediate slides and a standard prior art ball and retainer bearing assembly in place between the intermediate and outer slide.
Figure 9:
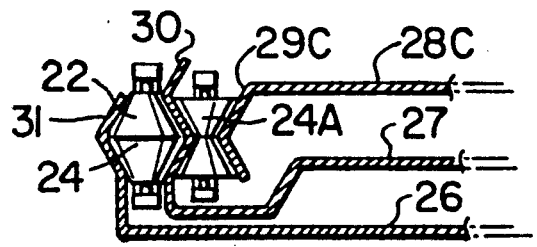
FIG. 9 shows a transverse cross-section of a three channel drawer slide wherein the embodiment of the invention shown in FIG. 6 is in place between the outer and intermediate channels and the embodiment shown in FIG. 7 is used between the intermediate and outer channels.

FIGS. 7, 8 and 9 show alternative embodiments of the invention all positioned within three-part channel slides of varying configurations. These three cross-sectional figures illustrate the versatility of the present invention. Unlike the prior art, the flanges of the channels need not maintain the configuration necessary to keep a ball but can be formed in any manner which is suitable and the moulded roller bearing cage assembly of the present invention can be adapted to fit within these varying configurations of flanges. In addition the "straight line effect" of the rollers in FIG. 9 reduces wear and stress.

In FIG. 7, one sees in cross-section a roller bearing cage assembly which is in a sense the reverse of that shown in FIG. 6. The roller bearings 24a are shaped like an hour glass having a mid point of minimum diameter and each end of maximum diameter. The bearings are moulded in similar cages as that shown in the first embodiment with the exception that the cross-section of the cage has a cross-section which is almost of a constant width. In order for the roller to turn within the raceways of the flanges of channels 26a, 27a, and 28a, the diameter of the bearing 24a is larger than cage 22a throughout. This allows the rollers 24a to turn against the raceways of the channels namely flanges 29a and 30a, and 30a and 31a, respectively.

The assembly of a three channel slide as shown in FIG. 7 is similar to that of FIG. 6 and similarly the frangible links 25 are broken when channel 27a is fitted within 26a and again when channel 28a is fitted within channel 27a. One also notes that the top and the bottom of the cage assembly 20a and 21a respectively are in similar positions to that shown in FIG. 6.

In FIG. 8 one sees a third embodiment of the invention. The roller 24b has a similar shape to roller 24a except that the side configuration is curvilinear rather than straight shaped, in cross-section. The drawer slide shown in the transverse cross-section view of FIG. 8 is a combination of an embodiment of the present invention along with a prior art embodiment using a retainer 4 with balls 6. Channels 26b, 27b and 28b have flanges 31b, 30b and 29b respectively configured to adapt to the different roller and balls used. Again on assembly the frangible links 25 which attach the rollers 24b to the cage 22b of the bearing cage assembly 18 are broken when the channel 28b is fitted within channel 27b during assembly.

Finally, FIG. 9 is a transverse cross-section of a three channel drawer slide which employs roller bearings of similar configurations as shown in FIG. 6 namely roller type 24 along with a roller type 24a as shown in FIG. 7. Roller type 24 is used between flange 31 of outer channel 26 and flange 30 of intermediate channel 27. Subsequently, roller type 24a is used between flange 30 of intermediate channel 27 and flange 29c of inner channel 28c.

In conclusion, one can understand that the present invention is not restricted to the particular embodiments described herein but covers any type of drawer slide and cabinet arrangement in which rollers which are moulded together with the cage assembly from thermal plastics, and are connected to the said assembly with frangible links. Furthermore, the invention is not restricted to three or even two part slides but can be used in any drawer and cabinet where lower friction is desirable.

What I claim as my invention is:

1. A moulded roller bearing cage assembly for use with slides for drawers and cabinets comprising a plurality of rollers and a cage having a plurality of apertures; wherein the maximum diameter of said rollers exceeds the maximum width of said cage; said rollers being positioned in said apertures and integral with said cage and being connected to said cage at their ends solely through narrow frangible links; said frangible links serving to maintain said rollers in position in their apertures until and during the time of installation and thereafter being breakable by engagement with raceway surfaces in the installation to enable rotation.

2. A moulded roller bearing cage assembly as claimed in claim 1 wherein said assembly is produced from durable plastic.

3. An assembly as claimed in claim 1 wherein a plurality of said assemblies are moulded together during manufacture by means of link connections, said connections being breakable during assembly, thereby detaching individual assemblies from one another.

4. An assembly as claimed in claim 1 wherein said rollers and said cages are substantially diamond shaped in cross-section.

5. An assembly as claimed in claim 1 wherein the mid-point of each of said rollers has a greater diameter than its ends.

6. An assembly as claimed in claim 1 wherein the mid-point of each of said rollers has a lesser diameter than its ends.

7. An assembly as claimed in claim 1 wherein the cross-section of said cage is substantially similar in shape to that of said rollers, and wherein the maximum width of said cage is less than the maximum diameter of said rollers.

8. A drawer slide for use with drawers and cabinets comprising:

an inner channel and an outer channel having raceway surfaces, and at least one molded roller bearing cage assembly positioned between said channels, said molded roller bearing cage assembly having a plurality of rollers and a cage having a plurality of apertures, and wherein the maximum diameter of said rollers exceeds the minimum width of said cage, and the peripheral surfaces of said rollers engaging said raceway surfaces, and wherein prior to operation of said drawer slide, said rollers are positioned in said apertures and are integral with said cage being connected thereto at their ends solely through narrow frangible links, and wherein, upon operation of said drawer slide, said frangible links are broken by the engagement of said rollers with said raceway surfaces.

9. A drawer slide for use with drawers and cabinets comprising:

an inner channel, an intermediate channel and an outer channel, said channels having raceway surfaces, at least one molded roller bearing cage assembly positioned between said outer channel and said intermediate channel, and at least one molded roller bearing cage assembly positioned between said inner channel and said intermediate channel, said molded roller bearing cage assembly having a plurality of rollers and a cage having a plurality of apertures, and wherein the maximum diameter of said rollers exceeds the minimum width of said cage, and the peripheral surfaces of said rollers engaging said raceway surfaces, and wherein, prior to operation of said drawer slide, said rollers are positioned in said apertures and are integral with said cage being connected thereto at their ends solely through narrow frangible links, and wherein, upon operation of said drawer slide, said frangible links are broken by the engagement of said rollers with said raceway surfaces.

* * * * *